United States Patent
Schneider et al.

(10) Patent No.: US 6,192,569 B1
(45) Date of Patent: Feb. 27, 2001

(54) PROCESS FOR MANUFACTURE OF A TOP FOR A CONTAINER WITH A DETACHABLE COVER REUSABLE AS A CAP

(75) Inventors: Bernard Schneider, Sainte-Menehould; Jean-Paul Meausoone, Reims, both of (FR)

(73) Assignee: Cebal SA, Clichy (FR)

( * ) Notice: Subject to any disclaimer, the term of this patent is extended or adjusted under 35 U.S.C. 154(b) by 0 days.

(21) Appl. No.: 08/839,797

(22) Filed: Apr. 18, 1997

Related U.S. Application Data

(60) Provisional application No. 60/020,765, filed on Jun. 28, 1996.

(30) Foreign Application Priority Data

Apr. 22, 1996 (FR) .................................................. 96 05342

(51) Int. Cl.$^7$ .................................................. B23P 17/00
(52) U.S. Cl. .......................... 29/418; 215/323; 220/256; 29/521; 29/509
(58) Field of Search .................... 215/316, 323, 215/50; 220/254, 256; 29/418, 421.1, 422, 464, 465, 466, 509, 521

(56) References Cited

U.S. PATENT DOCUMENTS

| | | |
|---|---|---|
| 1,783,314 * | 12/1930 | Scofield .......................... 215/323 X |
| 4,405,053 | 9/1983 | Cherot . |
| 4,687,111 | 8/1987 | Marcus . |
| 5,249,695 * | 10/1993 | Luch et al. ........................ 220/254 X |
| 5,348,182 * | 9/1994 | Luch .................................... 220/256 |
| 5,348,183 * | 9/1994 | Luch et al. ........................ 220/265 X |
| 5,356,018 * | 10/1994 | DuBach ............................ 220/254 X |

FOREIGN PATENT DOCUMENTS

| | | | |
|---|---|---|---|
| 2523551 * | 9/1983 | (FR) ..................................... 215/256 |
| 2 649 676 | 1/1991 | (FR) . |
| 4-189759 * | 7/1992 | (JP) ..................................... 220/260 |

* cited by examiner

*Primary Examiner*—David P. Bryant
*Assistant Examiner*—Marc W. Butler
(74) *Attorney, Agent, or Firm*—Oblon, Spivak, McClelland, Maier & Neustadt, P.C.

(57) ABSTRACT

The invention relates to a process for manufacture of a top 1 intended to be attached on a container or a flexible tube 50 and comprising a neck 3 the opening 7 of which is connected by a tearable ring-shaped part 10 to a cover 20 serving as an impervious stopper prior to breaking of the ring-shaped part and then being able to serve for recapping. The cover 20 is extended by a plate 30 the periphery 31 of which has a common axis of symmetry with the tearable ring-shaped part 10 and is provided with at least three lugs 32. The skirt 40 is open at one end; its inner surface 46 is partially cylindrical, its section following the exact shape of the periphery 31, except for the lugs, of the plate 30, and is provided with at least three cavities 41 intended to accommodate said lugs. The skirt is drawn around the plate 30 to the point of immobilization, brought about by the insertion of the lugs 32 on the plate 30 into the cavities 41 of the skirt 40.

9 Claims, 4 Drawing Sheets

PROCESS FOR MANUFACTURE OF A TOP FOR A CONTAINER WITH A DETACHABLE COVER REUSABLE AS A CAP

This application claims the benefit of U.S. Provisional Application No. 60/020,765, filed Jun. 28, 1996.

FIELD OF THE INVENTION

The invention relates to the manufacture of a molded plastic top comprising an outlet opening connected by a tearable ring-shaped part to a cover serving as an impervious stopper prior to breaking. In the case of multi-dose packaging, this cover is used for the recapping of the opening. The top may be affixed to the open end of any container the opening of which is to be hermetically sealed prior to initial use and then be covered by a cap between uses.

The implementation of such tops avoids manufacturing caps separately and positioning these on the containers through costly industrial means. Any container for which the cost of manufacture constitutes an essential factor is particularly affected by this invention. It specifically involves producing flexible tubes intended to contain health products for mass consumption or even producing small-size containers, holding samples of cosmetic, health or parapharmacy products, often distributed free of charge.

The invention thus relates to two quite distinct fields in mass distribution, but for which packaging cost is an essential factor: the supplying of the general-consumption product at the lowest price and the supplying of samples, of cosmetic products for example, free of charge.

STATE OF THE ART

In the field of products for mass consumption, it has been sought for a long time to develop economical tops for flexible tubes intended, for example, to contain tooth paste. With the tube described in FR-A-2,712,258, the applicant has developed a top for a tube having a cover in the form of an easily-tearable inverted cap. The neck has a thick, ring-shaped inner rim which defines its opening and, on the other side of the tearable ring-shaped part, the part blocking the opening of the neck extends outward, forming a thick base which is joined to an outer cylindrical skirt.

Even if it resolves the economic problem initially posed, the tube according to FR 2,712,258 cannot be used completely under satisfactory conditions of convenience, cleanliness and hygiene. As a matter of fact, the product which was in contact with the surface of the cover is, immediately upon tearing of the ring-shaped part, on top of what has become a cap, which compels the user to begin by washing this cap if he does not wish to soil his hands. Moreover, this tube being intended for lower-cost distribution is not individually protected by an overwrap. Thus it is directly exposed to the open air in warehouses or on shelves and, in the course of this storage, the cover in the form of an inverted cap is likely to collect dust which adheres to the inner surface of the outer cylindrical skirt.

When the cover is used as a cap after tearing, this inner surface enters directly into contact with the outer surface of the neck, which itself has been exposed to dust throughout the storage period of the tube. There is a significant risk of tainting of the product which is close to the opening of the neck, which is prejudicial to the conditions of cleanliness customarily expected from the use of a tube, and in certain cases even may lead to non-conformity with health standards, since there is risk of product contamination.

In the second field of application, that of containers for samples, cosmetic-product samples currently are largely presented in the form of simple packets, difficult to tear and non-reusable. Unlike these simple packets, the contemplated sample is a true container, easy to uncap and reusable several times. In addition, it offers the advantage of having a form close to the packaging of the product actually marketed. Containers for samples certainly exist at the present time, but their embodiment does not differ from that of the commercial container: it requires separate manufacturing of the container and the cap, with a specific costly tamper-proofing device. The cost of manufacture of such containers for samples is justified only in the luxury trade. Now, it is sought here to propose containers for cosmetic-product samples for mass distribution, or even for small amounts of health or grooming products offered in the hotel trade.

Whether flexible tubes or containers for samples are involved, it thus is a question of producing them at a lower costs, whatever their form or material, but meeting the following criteria: preserving the cleanliness of the product contained at all times, in storage as well as in dispensing through the opening; having a tamper-proofing indicator and a cover reusable as a cap after tearing.

PROBLEM POSED

The applicant thus has sought to produce an economical top for a flexible tube or for any other container, easy to attach to the flexible tube or the container, comprising a neck always protected from dust, provided with a tamper-proofing indicator and topped with a cover which, after easy tearing, may be used as a cap sealing the tube hermetically and efficiently all throughout its use.

DESCRIPTION OF THE INVENTION

An initial purpose of the invention relates to a manufacturing process which results in the production of a top provided with at least a skirt, this either alone or attached to the main portion of a cap, being joined permanently by a ratchet mechanism on the top, near the cover.

This process comprises a step for manufacturing of the plastic top by any known molding technique (injection, compression, etc.), the top comprising an open end intended to be attached subsequently to the open end of the container or the flexible tube and comprising at its other end a neck the outlet opening of which is joined by a tearable ring-shaped part to a cover serving as an impervious stopper prior to breaking and then being used for recapping of the opening. The process also comprises a step for manufacturing of a plastic skirt by any known molding technique, the skirt being able to be alone or integral with a complete cap, and it is characterized in that:

said cover is extended beyond the outer surface of the neck by a plate the periphery of which is defined by a contour which has a common axis of symmetry with said tearable ring-shaped portion and is provided with at least three lugs;

said skirt is open at one end and its inner surface is at least partially cylindrical, its section following the exact shape of the periphery, except for the lugs, of the plate extending from the cover, the cylindrical portion of the inner surface being provided with at least three cavities intended to accommodate said lugs;

after formation of the top and the skirt, said skirt is guided along with respect to said plate, then drawn by its first end around same to the point of immobilization, this being brought about by the insertion of the lugs on the plate into the cavities on the inner surface of the skirt.

The top is molded with a lower central mold which defines its inner surface and a set of upper molds, central and peripheral, which define its outer surface. The top is composed of a shoulder and a neck. The shoulder has an open end intended to be attached by any known means to the open end of the container. If the latter is a flexible-tube body or any other container of a plastic compatible in fusion with the plastic of the top, fastening is achieved preferably by fusion: overmolding, mold compression, thermal welding, high-frequency or any other suitable welding method. If the container is another material, glass, metal or a plastic not compatible in fusion, fastening may be effected by gluing but, preferably, the shoulder is extended by joining means complementary to those of the container, such as screwing means or a ratchet mechanism.

The neck has any form whatever. It possesses, near the opening, a ring-shaped inner rim, delimited on its upper end by a tearable ring-shaped part which connects it to a cover topping the neck opening.

The plate, located in the extension of the cover, is molded in continuity of material with the latter. The plate and the cover extend appreciably perpendicularly to the axis of the opening. The peripheral contour of the plate, except for the lugs, embodies the outer contour of the upper section of the neck, located near the opening. It is in this sense that we have written: "the cover is extended beyond the outer surface of the neck." Thus, if the neck is not perfectly cylindrical, it is entirely possible that its base might be far more extended than its end bearing the opening, which may cause the periphery of said plate to be within an imaginary cylinder having its generatrix parallel to the axis of the neck and having the base of the neck for a directrix (see FIG. 8).

Moreover, the periphery of the plate is provided with at least three lugs which, when they are engaged in the cavities effected in the inner surface of the skirt, block any relative movement, in rotation or translation, of said skirt with respect to the plate.

The skirt has an open end, intended to appear first at the time of drawing of the skirt around the plate. We shall call this end "first end" and the other end "second end." The inner surface of the skirt is at least partially cylindrical, with a generatrix parallel to the axis of the neck, the directrix following the exact shape of the periphery, except for the lugs, of the plate extending from the cover. The cylindrical portion of the inner surface is provided with at least three cavities intended to accommodate said lugs. The distance between these cavities and the first end is a function of the neck height to be protected. These cavities may or may not be traversal.

The skirt, once driven-in by its first end around the plate, encircles the outer surface of the neck. The form of the first end of the skirt is defined in terms of the height of the neck to be protected, so that the skirt comes close to the surface of the neck when driving-in is completed, yet without touching it. An improved efficacy for protection of the neck is obtained by selecting for the contour of the first end of the skirt, the contour of the neck section corresponding to the level to which the said first end of the skirt comes when driving-in is completed, expanded outward by a few tenths of a millimeter.

The second end of the skirt may be open or else connected in continuity of material at the base of a cap. The cap, in addition to its base and said skirt, also may be provided with one or several outer skirts, intended for its easy gripping and to enhance the esthetic appearance of the container as a whole.

The skirt has an outer surface of any shape whatsoever, compatible with the shapes imposed on the inner surface in the first end and the cylindrical portion, described above. It should be sufficiently thin and flexible with respect to the lugs so as not to deform the latter at the time of drawing of the skirt.

The lugs on the plate and the cavities in the skirt are complementary means of joining by locking in rotation and translation. When the skirt is driven-in around the plate to the point of immobilization, there is a joining in rotation and translation of the skirt and the cover+plate unit. The cavities may be traversal; the apertures thus formed make it possible to accommodate lugs of considerable length, which improves the joining of the skirt and the top. Nonetheless, one may choose to keep these cavities closed at one end for reasons associated with the esthetic appearance of the periphery of the cap. In addition, lugs and cavities are presented here as complementary means of permanent joining: nothing prevents their respective positions from being reversed; that is, providing the skirt with lugs and the plate with cavities, or even providing the plate and skirt with any other complementary means of joining by locking in translation and rotation, such as combinations of complementary longitudinal channels and circumferential grooves/ribs.

Preferably, when the skirt is attached to the rest of a cap, the cylindrical portion of its inner surface extends as far as the second end and the cavities, provided on said cylindrical inner surface, are close to said second end. Thus, when the skirt has been driven-in around the plate to the point of trapping of the lugs in the apertures or cavities, the joining ensured by the lugs and the cavities is sufficiently rigid and close to the base of the cap to effectively transmit the force applied on the outer casing of the cap intended for tearing of the ring-shaped part.

When the skirt is implemented alone, with the second end open, the cavities may be implemented at a lesser or greater distance from the second end, nonetheless without being less than the thickness of the skirt. In this case, this skirt constitutes the skirt of the future cap, and the cover+plate unit, once detached from the top, constitutes the base thereof. The joining ensured by the lugs and the cavities is rigid. The user applies a force directly to the skirt, preferably near the plate. This force is transmitted to the plate owing to the rigid lug-cavity joining; then, amplified by a "lever-arm" effect due to the geometry of the plate, it brings about the tearing of the ring-shaped part through a relative movement of the plate+cover unit with respect to the neck.

So as to facilitate tearing, the ring-shaped inner rim of the neck and the cover+plate unit are clearly thicker than the tearable ring-shaped part. Thus, they behave as shell elements resisting the forces, and the constraints are concentrated on the ring-shaped part.

The neck possesses, near the opening, a ring-shaped inner rim connected by the tearable ring-shaped part to a cover which tops the opening of the neck. The cover comprises a transitional part between the plate-extension part and the tearable ring-shaped part. This transitional part is either a nipple if the diameter of the opening is small, for example in the case of containers for a sample; or a crown if the diameter is larger, for example in the case of tubes for toothpaste.

The nipple or crown has an axis of symmetry coinciding with the axis of the opening. After tearing of the ring-shaped part, the nipple or crown serves as a means for imperviousness.

The nipple or crown also may serve for recapping by repositioning in the opening and further driving-in with forcing, but this function may be ensured elsewhere, for example with complementary ratchet means located on the outer surface of the neck and on the inner surface of the skirt close to its first end.

In one form of the invention, tubes for samples are produced at lower cost by selecting preferably a specific form of nipple or crown making it possible, on the one hand, to combine the closing and imperviousness functions and, on the other, to ensure a tamper-proofing indicator function. This form already was described in FR2649676: the periphery of the crown or the nipple successively comprises, starting from the tearable ring-shaped part and going toward the connection at the base of the cover: an initial portion with the shape of a truncated cone, then a cylindrical portion with a diameter exceeding that of the opening, which we shall call an over-collar, a recessed shoulder, and finally a recessed cylindrical or truncated-cone-shaped portion.

The nipple or the crown is attached to the neck by the upper end of the ring-shaped inner rim defining the opening. The connection is delicate. It constitutes the tearable ring-shaped part, which may be described as an area of slight thickness extending on both sides of a frustum of a cone, as an extension of the first truncated-cone-shaped portion of the nipple or the crown and having a length ranging between 0.1 and 0.5 millimeters, separating the inner surface from the outer surface of the top. After tearing, the neck thus has its opening defined by a micro-chamfer in the shape of a truncated cone, located at the upper end of the ring-shaped inner rim, resulting from breaking of the ring-shaped part. The inner ring-shaped rim has a height 5 to 10% less than the recessed cylindrical or truncated-cone-shaped part of the nipple or the crown, which itself has the shape of a truncated cone semi-angled between 1 and 3°. The small diameter of the recessed shoulder is on the other hand greater, typically from 3 to 6%, than the diameter of the opening, the diameter of the over-collar then exceeding the diameter of the opening by 6 to 10%, so as to ensure locking after driving-in, which moreover facilitates the insertion of the recessed part through a prior, slightly greater expansion of this opening. The top and skirt, of plastic, thus have been obtained by molding, the set of molds used having imposed the respective forms described. After formation of the top and the skirt, the skirt is guided with respect to the plate, then drawn by its first end around the latter to the point of immobilization, this being caused by the insertion of the lugs on the plate into the cavities on the skirt. If the driving-in of the skirt around the plate is effected shortly after the formation of the top, the neck is protected immediately after the production of the top of the container. In addition, if, in the area of the first end of the skirt joined to the cover, the neck is provided with a shoulder, it is possible, through observation of the space separating this shoulder on the one hand, and the first end of the skirt on the other, to verify by a rapid visual inspection whether the cover has been torn. As a matter of fact, said space is not the same before and after the tearing of the ring-shaped portion. An inexpensive tamper-proofing indicator is thus obtained.

In another form of the invention, multiple recappings are facilitated and imperviousness is improved by positioning complementary ratchet means at a distance from the nipple or the crown which has only an imperviousness role. These means are located on the outer surface of the neck and on the inner surface of the skirt close to its first end. In this case, the nipple or the crown has a simpler form, cylindrical, without an over-collar and without a recessed shoulder. Its diameter exceeds the diameter of the opening by 3 to 6%.

Whatever the form selected for the nipple or the crown, the first end of the skirt, once the latter is driven-in around the plate to the point of immobilization of the lugs in the cavities, juts out from the apex of the shoulder at a height close to the height of the nipple or crown of the cover. This makes it possible to effectively protect the neck during storage.

In the case of flexible tubes or containers, easy tearing is promoted by a simple rotation around the axis of the opening. Preferably, the form of the specific neck section which defines the form of the inner surface of the first end of the skirt and the form of the periphery of the plate extending from the cover are selected with an axis of symmetry coinciding with the axis of the opening. The distribution of the lugs and cavities follows this axial symmetry.

Thus, if the plate and the specific section of the neck are circular, the inner surface of the skirt is either completely cylindrical with a circular section, or partially cylindrical and partially truncated-cone-shaped. The lugs and cavities preferably are distributed in a regular manner, angularly, for example at 120° if they both are three in number. Nonetheless, their number may be more than three, in terms of the general form selected: four for an ellipse, a square or an octagon, five for a pentagon, etc.

The neck unit also may be given a form in accordance with axis symmetry. Thus it may be cylindrical, in the general geometric meaning of the term; that is, with any directional curve whatsoever, the most common sections being, for example, circular, elliptical or polygonal. They also may be completely in the form of a nozzle or connector, connecting the shoulder to the delivery opening, the sections perpendicular to the axis being taken one from the other by homothety. It even may be cylindrical at its base, near the shoulder, then have a part in the form of a connector near the opening.

One form of the invention is particularly advantageous because it entails a critical reduction in manufacturing cost. In this form the skirt, the inner surface of which is cylindrical, is molded simultaneously with the top, in a temporary position which makes the unit easily moldable, with molds which are easy to produce and an easy unmolding. In this temporary position the skirt thus forms an inverted cap with the plate, the first end of the skirt being connected to the plate by a few bridge extensions of material at the time of molding. The set of molds comprises an upper central mold forming the inner surface of the inverted cap, a set of upper peripheral molds forming the outer surface of the skirt of the inverted cap and the rest of the top, and finally a lower central mold forming the inside of the top.

Preferably unmolding is performed, then the completely cooled molded unit is reworked by drawing it on a core having a form identical to the lower central mold, which is going to serve as a support for the top. A plate comes to rest on the second end of the skirt and effects an axial motion in the direction of the tube, forcing the breaking of the bridges which connected the skirt to the plate, then the driving-in of the skirt around the plate to the point of immobilization of the lugs in the cavities. The complete cooling of the molded unit makes it possible to cut thicker bridges. The latter serving for conveying the material into the skirt during the molding make it possible, if they are thicker, to accelerate production rates and improve the economic conditions of production, although the complete cooling of the molded unit requires an additional device in the production line.

In other forms of the invention, the skirt is produced separately, either isolated or attached to a complete cap. Preferably the cylindrical portion of the inner surface is provided with longitudinal grooves extending from the cavities in the direction of the first end of the skirt. These grooves make it possible to guide the lugs to their trapping in the cavities. They have a depth less than that of the cavities and a width at least equal to that of the lugs. In places these grooves thin out the skirt, which is easily deformable with respect to the lugs. The skirt thus overlaps the lugs without deforming them.

A second purpose of the invention relates to flexible tubes and containers provided with the top manufactured according to the invention. The flexible tube and the container have a plastic top comprising a neck the outlet opening of which is connected by a tearable ring-shaped part to a cover serving as an impervious stopper before the breaking of said ring-shaped part and then being able to be used for recapping of said opening, characterized in that said top is provided with a skirt, said skirt encircling said neck, being provided with means for joining, for example by a ratchet mechanism, with the cover by means of a plate which extends said cover and which is provided with means of joining complementary to those of the skirt; the skirt, cover and plate unit constituting a cap for recapping after tearing of said ring-shaped part.

Other characteristics and advantages will become evident in the description of the specific devices of the invention given below by way of examples, in no way restrictive.

EMBODIMENT ACCORDING TO THE INVENTION FOR A TOP FOR A TOOTHPASTE TUBE FIGS. 1, 2, 3, 7)

Figures 1, 2:
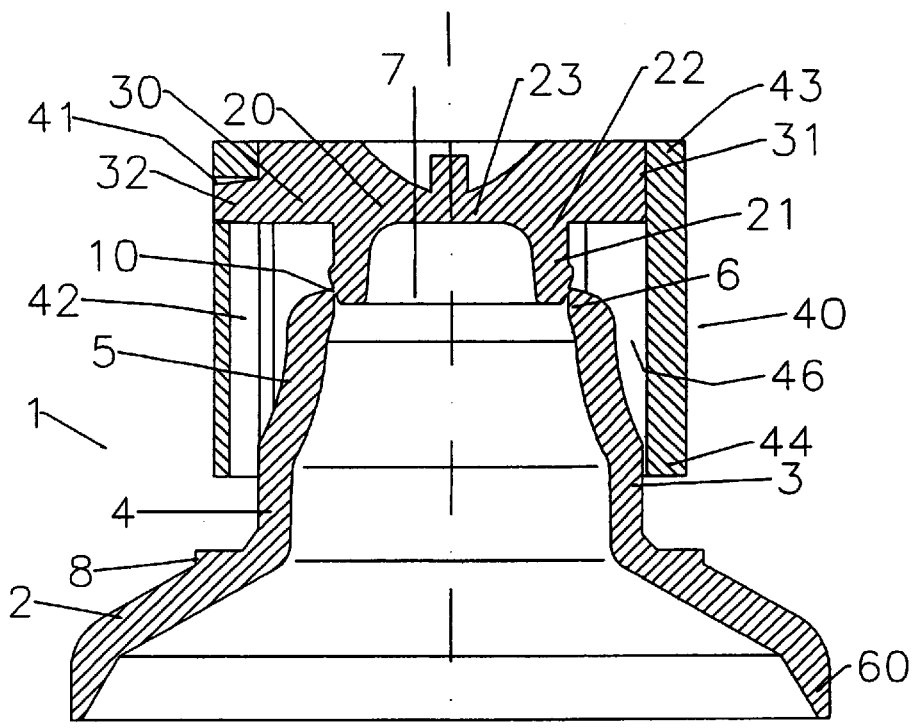
FIG. 1 represents a tube head according to the invention before tearing of the breaking zone (axial section).
FIG. 2 represents the tube top of FIG. 1 after tearing of the breaking zone and driving-in of the cap formed by the cover+plate+skirt unit (axial section).
Figure 4:
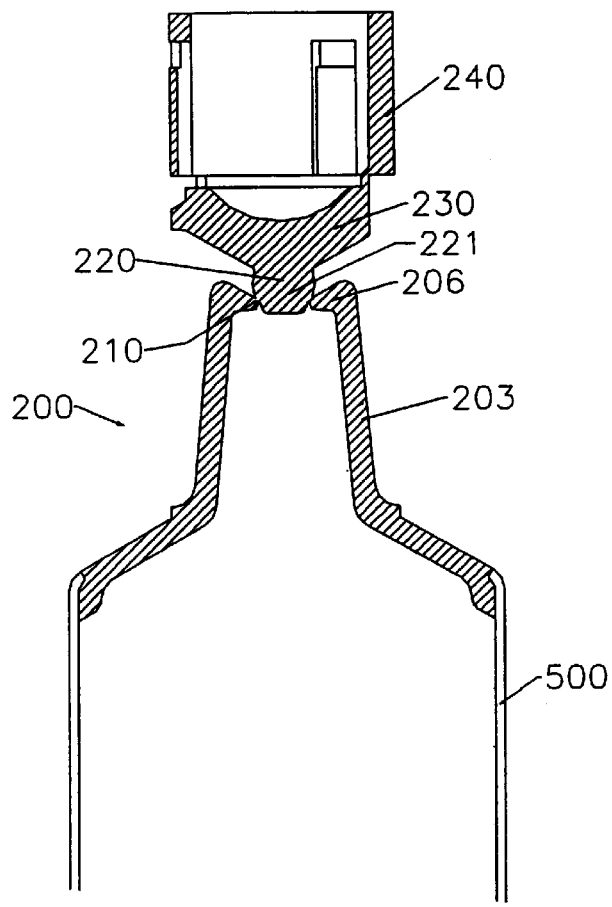
FIG. 4 represents the upper end of a tube with a flexible main portion and another tube top according to the invention, with a neck lengthened in the form of a nozzle, right after molding and before drawing of the skirt (axial section).

The tube consists of a flexible main portion 500, identical to that appearing in FIG. 4, and a top 1 identical to that represented in FIG. 1, both of plastic. The cylindrical flexible main portion 500 is produced by longitudinal welding of a multi-layer film having an EVOH barrier layer. One of its ends is fastened to the top and the other is still open. It is delivered this way to the toothpaste packager. The flexible main portion 500 has a diameter ranging between 25 and 35 mm and a thickness around 0.3 mm.

The main portion and the top have as the same axis of symmetry the axis 50 of the opening. FIG. 1 represents the top 1 of the flexible tube in its delivery condition; that is, provided with a cogged skirt 40.

Figure 5:
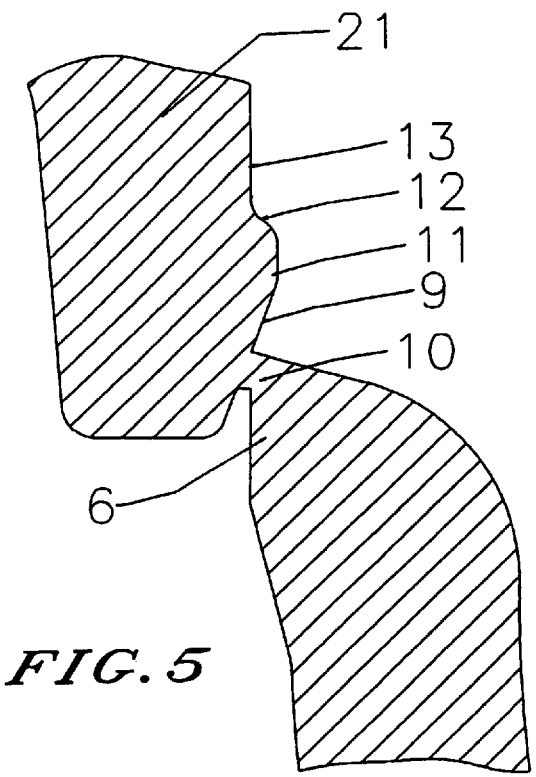
FIG. 5 represents the area of the tearable ring-shaped part before breaking.

It comprises a shoulder 2 of which the open end 60 is intended to be fastened to the end of the flexible main portion 500 of the tube. It also comprises a neck 3, of which the base 4 is circular cylindrical and the vertex is in the form of an axisymmetrical connector 5. The neck 3 has a ring-shaped inner rim 6 which defines an opening 7 with a diameter of 7.6 mm. The ring-shaped inner rim 6 is connected by a tearable ring-shaped part 10 to the crown 21 of the cover 20. The tearable ring-shaped part 10 as well as the crown 21 are detailed in FIG. 5: the periphery of the crown 21 comprises successively, starting from the tearable ring-shaped part 10 and going toward the attachment 22 at the base 23 of the cover: a first truncated-cone-shaped part 9, with a 20° vertex semi-angle, then the over-collar 11, a recessed shoulder 12, and finally a slightly truncated-cone-shaped recessed part 13.

The crown 21 is attached to the neck 3 by the upper angle of the ring-shaped inner rim 6 defining the opening 7. The attachment 10 is delicate. It constitutes the tearable ring-shaped part, which may be described as a zone of slight thickness extending on both sides of a frustum of a cone, as an extension of the first truncated-cone-shaped part 9 of the nipple or the crown and having a length of 0.3 millimeters, separating the inner surface from the outer surface of the top. The truncated-cone-shaped recessed portion 13 of the crown has a semi-angle of 3°. The small diameter of 7.9 mm of the recessed shoulder 12 exceeds the diameter of the opening 7. The diameter of the over-collar 11 is equal to 8.2 mm.

The plate 30 is located in the extension of the cover 20. It is molded in continuity of material with the latter. The plate 30 and the cover 20 extend perpendicularly to the axis 50 of the opening. The periphery 31 of the plate is circular, it has a diameter of 13.5 mm. It is provided with lugs 32 projecting radially; that is, projecting 1.5 mm radially beyond the plate.

Figure 3:
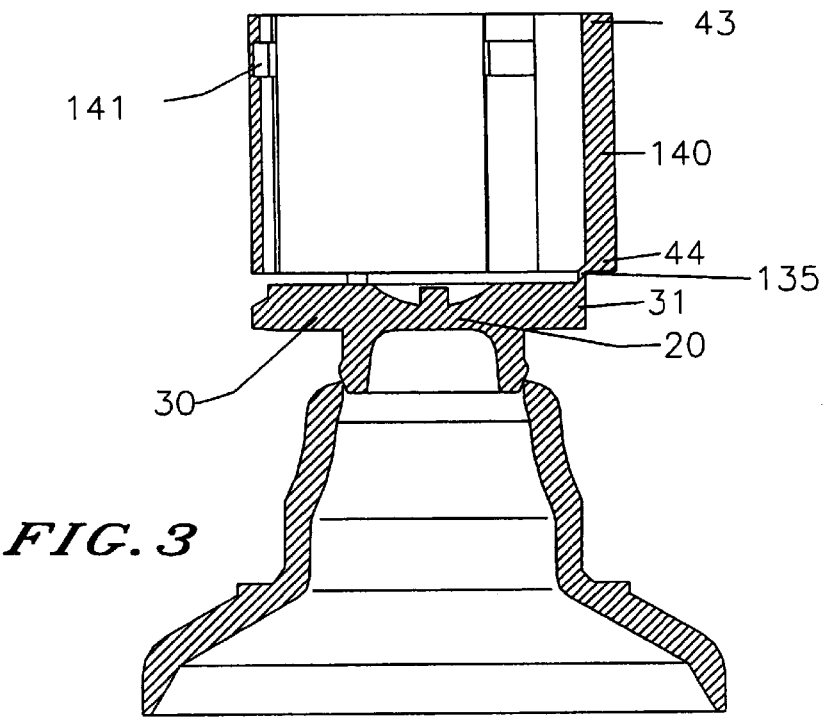
FIG. 3 represents a tube top similar to that of FIG. 1 right after molding and before driving-in of the skirt around the plate, the skirt here having cavities closed at one end (axial section).

The skirt 40 has an outside diameter of 16 mm and a thickness of 1 mm, exclusive of grooves. It is provided with cavities 41, which in FIGS. 1 and 3 are traversal spaces, located two millimeters from the edge of the second end 43. On the inner surface 46 of the skirt 40, longitudinal grooves 42 with a depth of 0.35 mm extend from the first end 44 of the skirt 40 to the traversal spaces 41.

FIG. 3 represents a skirt 140, geometrically identical to the skirt 40 of the first two Figures, but which is molded at the same time as the top, in a temporary position which gives the appearance of an inverted cap. Here, the cavities 141 are represented as non-opening. Not only are the top 1 and the skirt 140 molded simultaneously, but even the fastening of the top onto the flexible main portion 500 of the tube also is accomplished during this phase, by overmolding; that is, through autogenous welding, by using the following tooling:

A lower central mold, intended to define the geometry of the inner surface of the top, is inserted inside the flexible main portion 500.

A set of upper peripheral molds is positioned to define the outer surface of the shoulder 2 of the neck 3 of the cover+plate unit (20; 30), and the skirt 140.

An upper central tooling also is positioned to define the inner surface of the skirt 140 and the upper surface of the cover 20 and the plate 30.

Connecting bridges are provided between the upper central mold and the upper peripheral molds, so as to leave transits of thin-section material: 0.3 to 0.8 mm², which after removal from this set of upper molds leaves a series of three bridges 135 between the periphery 31 of the plate 30 and the first end 44 of the skirt 140.

The upper molds then are moved aside for unmolding. So as to limit the constraints associated with unmolding of the thin-section undercut zones, grooves which extend beyond the cavities and open at the edge of the second end 43 of the skirt 140 preferably are used.

The lower mold is kept in place to serve as a support for the top. A plate comes to rest on the second end 43 of the skirt and imposes on the skirt a driving-in motion in the direction of the tube. The bridges 135 give way and the skirt (40; 140) is drawn around the plate, the lugs 32 of the plate 30 resting on the bottom surface of the grooves 42 and in places slightly deforming the section of the skirt (40; 140) until the cavities (41; 141) reach their level. At this point, the lugs 32 are trapped in the cavities (41; 141) and block any relative movement of the skirt with respect to the top 1.

In order that the bridges 135 will give way easily, a frangible, moldable plastic material, under the circumstances low-density polyethylene (LDPE), has been selected as the material for the top of the tube. High-density polyethylene or polypropylene also might be suitable, with an admixture of charge, such as talc particles.

The tube is delivered in this form to the toothpaste packager, who fills the tube through the still-open end of the flexible main portion of the tube, then seals the latter. The tube then is placed on the market and, throughout the transport and storage phase, prior to supplying to the final consumer, its neck is fully protected by the skirt. By observing the distance between the first end 44 of the skirt and the shoulder 8 located at the base of the neck 3, the user immediately can check the tamper-proofing of the tube, because this distance is very small when the cover is not on the tube, as FIG. 2 illustrates.

At the time of initial use of the product contained in the tube, the user tears the ring-shaped part 10 by subjecting it to a rotary motion with respect to the axis of the tube, by application of the fingers to the skirt (40). The unit constituted by the cover, the plate and the skirt (20; 30; 40) is thus detached from the rest of the top and may be reused as a cap. The crown 21 serves as a skirt for imperviousness and as means for closing by locking after driving-in, the over-collar 11 being blocked under the inner ring-shaped rim 6 defining the opening 7 of the neck 3.

Figure 7:
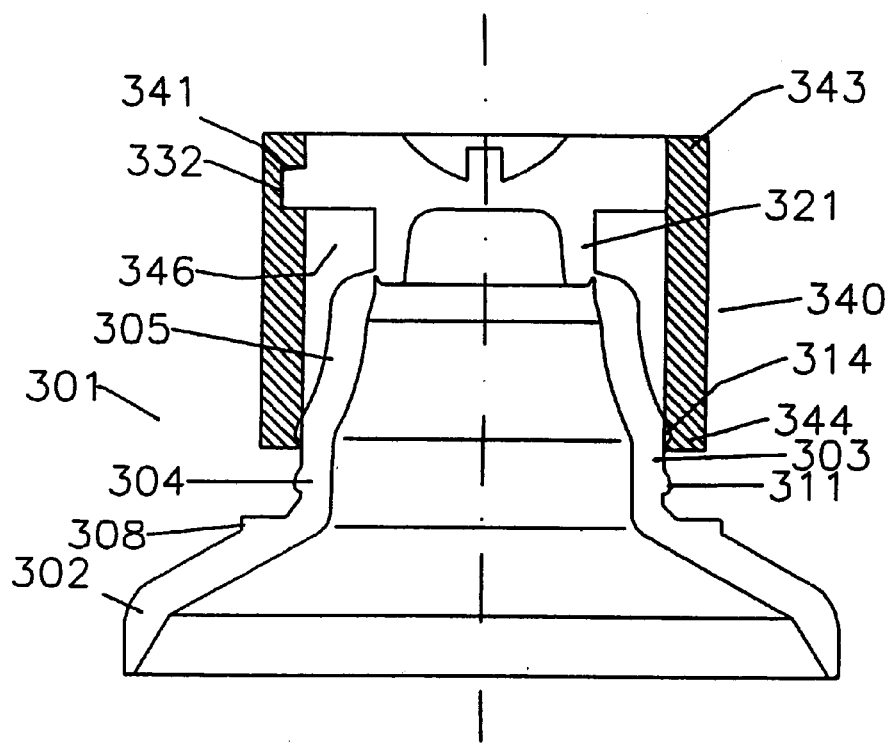
FIG. 7 represents a tube top made according to the invention, before tearing of the breaking zone, equipped with a skirt making it possible to obtain a cap which is esthetic and easy to recap.

The tube top illustrated in FIG. 7 is a variant of that illustrated in FIG. 1. leading to a cap which is more esthetic and easier to recap. It is characterized by a cylindrical skirt 340 the inner surface of which is without grooves, a straight imperviousness skirt 321 and complementary ratchet means (311 and 314) located on the outer surface of the neck 311 and on the inner surface of the skirt 340. close to its first end 314. As the cylindrical skirt 340 is molded simultaneously with the top, it is not necessary to guide the lugs 332 toward the cavities 341 at the time of driving-in of the skirt. The complementary ratchet means dissociated from the imperviousness skirt make it possible to obtain lesser exertion in closing and an improved imperviousness for multiple- and repeated-closing tubes.

Embodiment According to the Invention For a Tube Top For Direct Application of Cosmetic Cream to the Scalp (FIG. 4)

The tube top 200 of FIG. 4 differs from the preceding one in its neck 203, in the form of a nozzle. Its end contains a slightly concave ring-shaped inner rim 206, connected by means of a tearable ring-shaped part 210 to a nozzle 221 on the cover 220, extended by a plate 230, following a frustum of a cone the semi-angle of the vertex of which is open, on the order of 60°. The concavity of the inner ring-shaped rim 206 makes the end of the nozzle non-traumatizing and thus makes possible direct application of the product to the skin, under the circumstances here, to the scalp.

As in the preceding example, the skirt 240 is drven-in around the plate and ensures the cleanliness of the applicator end of the channel.

Embodiment According to the Invention For a Top For a Small-size Flexible Tube For a Sample of a Cosmetic, Health or Parapharmacy Product Such tubes are of a material and configuration as a whole identical to those of the preceding tubes. They differ in smaller dimensions, which involve some manufacturing adaptations:

the flexible main portion 500 has a diameter of 16 mm and a thickness around 0.3 mm.

the neck 3, the cylindrical base 4 of which has a diameter of 8 mm, is joined by a connector 5 to a ring-shaped inner rim 6 which defines an opening 7 with a diameter of 2.5 mm. The ring-shaped inner rim 6 is connected by a tearable ring-shaped part 10 to a nipple affixed to the cover 20. The outer contour of the nipple follows the configuration described in FIG. 5.

the skirt has an outside diameter of 11.5 mm, a thickness exclusive of groove of 1 mm, grooves 42 with a depth of 0.35 mm, and three spaces 41, here traversal, located 1 mm from the edge of the second end of the skirt 43.

the plate 30 has a diameter exclusive of lugs of 9.5 mm, and three lugs 31 with a radial projection of 1 mm.

Figure 6:
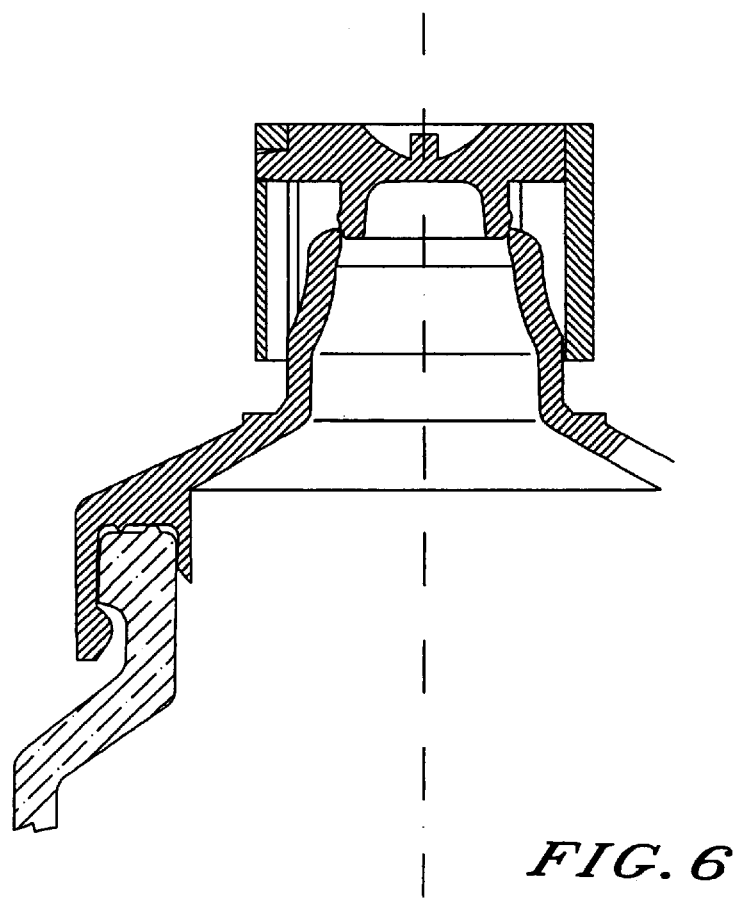
FIG. 6 represents a top according to the invention fastened to the open end in the form of a flange on a glass container.

Embodiment According to the Invention For a Top For a Container For a Sample of a Cosmetic, Pharmaceutical or Grooming Product (FIG. 6)

Such containers may be of metal, glass or plastic, or any other material. The form also may be any one whatsoever: it is sufficient to mold one end of the shoulder adapted to the geometry of the open end of the container. For esthetic reasons, the cap may take on a form in harmony with the rest of the container, for example an elliptical, polygonal (triangle, square, hexagon, octagon, etc.) section. The skirt may either retain the circular form of the preceding examples, and in this case it may be attached to a cap molded separately from the top, or directly assume the desired form with the plate which is combined therewith. In this case, the number of lugs on the plate and the cavities on the skirt, preferably non-opening, is a function of the geometry sought: three for circular, triangular and hexagonal forms, four for square and octagonal forms, five for pentagonal forms, etc.

FIG. 6 represents the section of the open end of a glass container. It is in the form of an outer flange, of the "penicillin" type. The end of the tube top produced according to the invention is adapted to the flange so as to be affixed to the container by a ratchet mechanism. Other solutions exist, making use of the setting of an intermediate crown.

Such tops on plastic or metal containers also may be adapted by a ratchet mechanism. As the tearing of the cover requires a rotary motion, this top is provided with a rotational blocking device, for example with a radial notch which becomes blocked on a rough area of the surface of the container.

Figure 8:
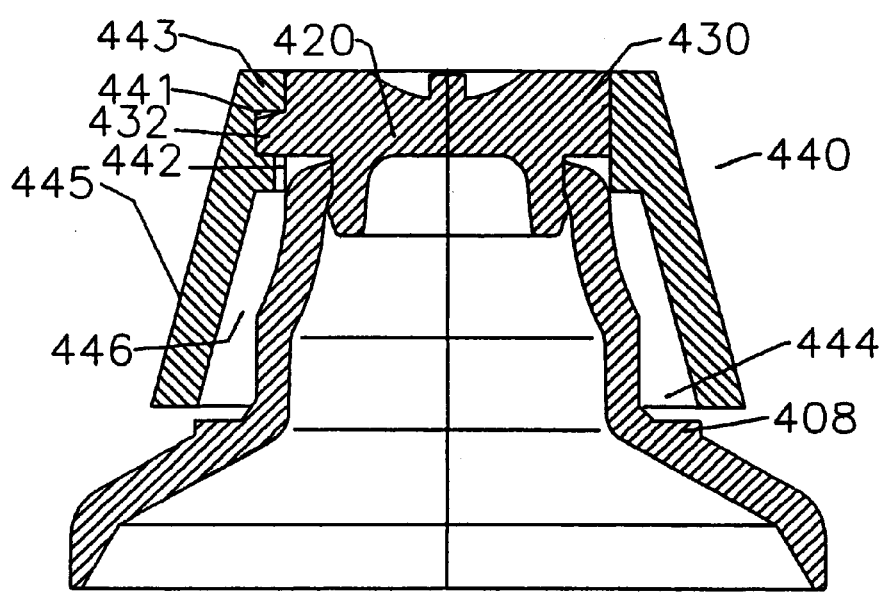
FIG. 8 represents a tube top made according to the invention, after tearing and driving-in of the skirt produced separately, said skirt having an outer surface with a truncated-cone shape.

Embodiment According to the Invention of a Flexible Tube Top For a Cosmetic, Health or Parapharmacy Product (FIG. 8)

FIG. 8 represents a tube top made according to the invention with a skirt 440 the outer surface 445 of which, in the shape of a truncated cone, makes it possible to obtain a cap of conventional form, not running counter to consumer customs. The skirt 440 has been made separately. Its inner surface 446, cylindrical near its second end 443, is provided with grooves 442 which make it possible to guide the lugs 432 toward the non-opening cavities 441 at the time of driving-in of the skirt around the plate extending the cover. The outer surface may be provided with scoring facilitating gripping. The cylindrical portion of the inner surface advantageously is of limited height: a height appreciably equal to 3 times the height of the lug is sufficient.

Advantages economical production of tops for tubes intended for mass distribution of inexpensive health products, for example for third-world countries.

economical production of tops for containers for samples distributed free of charge to test new cosmetic, parapharmaceutical, health or grooming products.

economical production of tops for containers for pharmaceutical products.

economical production of tops for containers or flexible tubes containing health and grooming products in the hotel trade and travel industry.

cleanliness of container tops, specifically of the neck in the area of the delivery opening, at all times, before and after the cover is removed.

visible tamper-proofing check, in compliance with existing regulations.

cleanliness ensured even with a non-axisymmetrical geometry, owing to the form of the skirt suitably adapted to the periphery of the neck.

Provisional U.S. application Ser. No. 60/020,765 and French patent application 96 05342 are incorporated herein by reference.

What is claim is:

1. A method for manufacturing a top for closing a container, comprising steps of:

forming a plastic top member with an open end configured to connect to an opening in said container, said plastic top member having, a neck having a ring-shaped inner rim that defines an outlet opening, a tearable ring-shaped part, a cover connected to said ring-shaped inner rim by said tearable ring-shaped part so as to provide an impervious stopper for said container prior to a user tearing open said tearable ring-shape d part when opening said container for a first time, said cover having a same axis of symmetry as said outlet opening, and having, a circular plate extending perpendicularly from said axis of symmetry, and at least three lugs projecting radially from a periphery of said circular plate;

forming a skirt with a common axis of symmetry as said axis of symmetry of said cover, said skirt having, an open end, wherein an inner surface of said open end is at least partially cylindrical and follows a same shape as said periphery of said circular plate, except for at least three cavities formed in said inner surface that are positioned to receive said at least three lugs of said periphery of said cover; and passing said skirt along a direction of said axis of symmetry over said cover such that said at least three cavities of said skirt receive said at least three lugs of said cover and said skirt becomes immobilized with respect to said plastic top member and said skirt closely encircles an outer surface of said neck so as to protect said neck from contaminants.

2. The method of claim 1, wherein:

said step of forming a skirt comprises forming said at least three cavities closer to an opposing end of said skirt than said open end.

3. The method of claim 1, wherein:

said step of forming a plastic top member comprises forming said tearable ring-shaped part to be less thick than either of said ring-shaped inner rim and said cover.

4. The method of claim 1, further comprising:

forming a temporary portion in a shape of at least one of a crown and a nipple in said cover, adjacent to said tearable ring-shaped part so as to serve as an impervious member after said tearable ring-shaped part is torn.

5. The method of claim 4, wherein:

said step of forming a temporary portion includes forming said temporary portion with a mechanism for closing said open end of said top by locking said temporary portion at an end of said temporary portion that is driven into said open end.

6. The method of claim 5, wherein:

said step of forming a plastic top member includes forming said neck with a shoulder that serves as a tamper-proof indicator, a predetermined separation distance between said shoulder and said one end of said skirt being indicative of said container being open.

7. The method of claim 1, wherein:

said step of forming a skirt being performed simultaneously with said step of forming a plastic top member such that said skirt is positioned in a temporary position which causes said skirt to assume, with said cover and said circular plate, a form of an inverted cap so that said one end of said skirt that is open being connected to said circular plate by bridge extensions of material; and including additional steps of removing said skirt, said cover, and said circular plate as a single unit from molds used to form the single unit, cooling the single unit, supporting the single unit on a core having a same shape as an inside surface of the open end of the plastic top member, and positioning a movable plate to come to rest on a second end of said skirt so as to effect an axial motion in a direction of a center of said container and forcing a breaking of said bridge extensions and driving-in said skirt around said circular plate to a point of immobilization of said at least three lugs in said at least three cavities.

8. The method of claim 1, wherein:

said step of forming a skirt includes forming longitudinal grooves on said inner surface of said skirt between said open end and said at least three cavities, said longitudinal grooves having a depth being less than a projection length of said at least three cavities, and having a width being at least equal to that of said at least three lugs on said circular plate, and said step of passing said skirt comprises guiding said at least three lugs into said at least three cavities with said longitudinal grooves.

9. A method for manufacturing a top for closing a container, comprising steps of:

forming a plastic top member with an open end configured to connect to an opening in said container, said plastic top member having,
- a neck having a ring-shaped inner rim that defines an outlet opening,
- a tearable ring-shaped part,
- a cover connected to said ring-shaped inner rim by said tearable ring-shaped part so as to provide an impervious stopper for said container prior to a user tearing open said tearable ring-shaped part when opening said container for a first time, said cover having a same axis of symmetry as said outlet opening, and having,
  - a circular plate extending perpendicularly from said axis of symmetry, and
  - means for interlocking said cover with a skirt that fits over a periphery of said circular plate;

forming a skirt with a common axis of symmetry as said axis of symmetry of said cover, said skirt having,
- an open end, wherein an inner surface of said open end is at least partially cylindrical and follows a same shape as said periphery of said circular plate, and
- means for receiving said means for interlocking said cover; and passing said skirt along a direction of said axis of symmetry over said cover and said means for interlocking is inserted into said means for receiving until said skirt becomes immobilized with respect to said plastic top member and said skirt closely encircles an outer surface of said neck so as to protect said neck from contaminants.

* * * * *